United States Patent
Hanada et al.

(10) Patent No.: US 9,275,764 B2
(45) Date of Patent: Mar. 1, 2016

(54) OPERATION MONITORING APPARATUS OF NUCLEAR POWER PLANT

(75) Inventors: Satoshi Hanada, Tokyo (JP); Koji Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 329 days.

(21) Appl. No.: 13/813,504

(22) PCT Filed: Jul. 25, 2011

(86) PCT No.: PCT/JP2011/066861
§ 371 (c)(1),
(2), (4) Date: Jan. 31, 2013

(87) PCT Pub. No.: WO2012/017852
PCT Pub. Date: Feb. 9, 2012

(65) Prior Publication Data
US 2013/0129030 A1    May 23, 2013

(30) Foreign Application Priority Data

Aug. 2, 2010    (JP) .................................. 2010-174022

(51) Int. Cl.
*G21C 17/00* (2006.01)
*G21D 3/00* (2006.01)

(52) U.S. Cl.
CPC ................ *G21C 17/00* (2013.01); *G21D 3/008* (2013.01); *Y02E 30/40* (2013.01)

(58) Field of Classification Search
CPC .................................. G21C 17/00; G21D 3/008
USPC ........................................................ 376/259
See application file for complete search history.

(56) References Cited

U.S. PATENT DOCUMENTS 4,427,620 A * 1/1984 Cook ............................. 376/259
4,585,609 A * 4/1986 Le Rat ........................... 376/259
(Continued)

FOREIGN PATENT DOCUMENTS

JP   55-115107 A   9/1980
JP   07-087579 A   3/1995
(Continued)

OTHER PUBLICATIONS

Translation of Written Opinion dated Aug. 30, 2011, issued in corresponding application No. PCT/JP2011/066861.
(Continued)

*Primary Examiner* — Jack W Keith
*Assistant Examiner* — Daniel Wasil
(74) *Attorney, Agent, or Firm* — Westerman, Hattori, Daniels & Adrian, LLP

(57) ABSTRACT

In an operation monitoring apparatus of a nuclear power plant, a first operation console (12) that can be operated by an operator and includes displays (31 to 37), an operation command console (14) that can be operated by a shift supervisor and includes displays (41 to 44), a transfer device (51) that can display an image displayed on the displays (31 to 37) of the first operation console (12) on the displays (41 to 44) of the operation command console (14), and a switching device (54) that switches an image on the displays (41 to 44) of the operation command console (14) to the image on the displays (31 to 37) of the first operation console transferred by the transfer device (51) are provided. With this configuration, it is possible to improve communications between the supervisor and the operation in operation of the nuclear power plant.

3 Claims, 3 Drawing Sheets

(56) References Cited

U.S. PATENT DOCUMENTS

| | | | |
|---|---|---|---|
| 4,957,690 A * | 9/1990 | Fennern | 376/216 |
| 5,247,433 A * | 9/1993 | Kitaura et al. | 376/259 |
| 5,267,277 A * | 11/1993 | Scarola et al. | 376/259 |
| 5,559,691 A * | 9/1996 | Monta et al. | 376/259 |
| 5,812,622 A * | 9/1998 | Chang et al. | 376/259 |
| 5,859,885 A * | 1/1999 | Rusnica et al. | 376/259 |
| 6,671,632 B2 * | 12/2003 | Sridhar et al. | 702/33 |
| 6,820,036 B2 * | 11/2004 | Kitamura et al. | 702/182 |
| 6,847,906 B2 * | 1/2005 | Ozawa | 702/81 |
| 7,933,955 B2 * | 4/2011 | Khalatian | 709/205 |
| 8,259,990 B2 * | 9/2012 | Kitamura et al. | 382/100 |
| 2008/0016155 A1 | 1/2008 | Khalatian | |
| 2008/0205693 A1 | 8/2008 | Kitamura et al. | |

FOREIGN PATENT DOCUMENTS

| | | | |
|---|---|---|---|
| JP | 07-320177 A | | 12/1995 |
| JP | 2001-142525 | * | 5/2001 |
| JP | 2001-142525 A | | 5/2001 |

OTHER PUBLICATIONS

Decision of a Patent Grant dated Sep. 9, 2014, issued in corresponding Japanese Patent Application No. 2010-174022, with English Translation (3 pages).
International Search Report of PCT/JP2011/066861, mailing date of Aug. 30, 2011.
Extended European Search Report dated Dec. 11, 2015, issued in counterpart European Patent Application No. 11814482.1 (6 pages).

* cited by examiner

OPERATION MONITORING APPARATUS OF NUCLEAR POWER PLANT

FIELD

The present invention relates to an operation monitoring apparatus of a nuclear power plant that can operate a safety system and a custom system (a non-safety system).

BACKGROUND

To operate a nuclear power plant stably, an easily operable instrumentation control system having high reliability is required. To realize such an instrumentation control system, application of a soft-operation type central control panel and digitization of a control system and a safety system facility have been promoted. In the instrumentation control system in a nuclear power plant, a central control panel that monitors operations of the plant by an operator is provided, and a plurality of operators who monitor operations of the central control panel are positioned with respect to the central control panel and a shift supervisor is positioned behind these operators. Each of the operators performs reliable monitoring and operations under various supervisions and commands from the shift supervisor, thereby ensuring safe operations of the nuclear power plant.

The following Patent Literature 1 describes an example of an operation monitoring apparatus of a nuclear power plant.

CITATION LIST

Patent Literature

Patent Literature 1: Japanese Laid-open Patent Publication No. 07-087579

SUMMARY

Technical Problem

Conventionally, in principle, communications between a shift supervisor and each operator are made by verbal commands as well as pointing and calling performed by operators. When a plant is operated by using an existing central control panel constituted by hardware instruments, the shift supervisor can generally ascertain operation details of the operators from his own seat by watching standing positions and hand movements of them from behind.

In an instrumentation control system of a nuclear power plant, when digitization of a control system and a protection system facility is implemented, a shift supervisor and operators mainly perform monitoring and operations of the plant by a touch operation by using a central control panel as they are seated. In this case, communications between the shift supervisor and the operators are made only by verbal commands as well as pointing and calling performed by operators, and positions of the operators watched from behind by the shift supervisor in his own seat do not change. Accordingly, the shift supervisor can only see the operators touching a monitoring operation screen regardless of what operations they are performing, and thus it is difficult for the shift supervisor to visually ascertain what operations the operators are performing.

The present invention has been achieved to solve the above problems, and an object of the present invention is to provide an operation monitoring apparatus of a nuclear power plant that can ensure highly safe monitoring of operations by improving communications between a shift supervisor and operators in operation of the nuclear power plant.

Solution to Problem

According to an aspect of the invention, an operation monitoring apparatus of a nuclear power plant includes: an operation console that can be operated by an operator and includes an operation unit and a display unit; an operation command console that can be operated by a shift supervisor and includes an operation unit and a display unit; a transfer device that can display an image displayed on the display unit of the operation console on the display unit of the operation command console; and a switching device that switches an image on the display unit of the operation command console to an image on the display unit of the operation console transferred by the transfer device.

Therefore, by displaying an image displayed on the display unit of the operation console on the display unit of the operation command console as required, the shift supervisor can ascertain operations performed by the operator, and thus communications between the supervisor and the operator in operation of the nuclear power plant can be improved, thereby ensuring high safety in monitoring of operations.

Advantageously, in the operation monitoring apparatus of a nuclear power plant, the operation command console includes an operation switch that operates the switching device.

Therefore, by operating the switching device by the operation switch, the shift supervisor can easily display an image on the display unit of the operation console on the display unit of the operation command console.

Advantageously, in the operation monitoring apparatus of a nuclear power plant, the operation console includes a plurality of display units, and the switching device displays an image selected from the display units on the display unit of the operation command console.

Therefore, by operating the switching device by the operation switch, the shift supervisor can easily display a necessary image on the display unit of the operation console on the display unit of the operation command console.

Advantageously, in the operation monitoring apparatus of a nuclear power plant, the operation command console includes an auxiliary display unit that can display a name of each of the display units in the operation console displayed on the display units.

Therefore, by displaying a currently displayed name of each of the display units in the operation console on the auxiliary display unit in the operation command console, visibility of the operation monitoring apparatus can be improved.

Advantageously, in the operation monitoring apparatus of a nuclear power plant, each of the display units of the operation console includes a display lamp that lights up when an image is displayed on the display unit of the operation command console.

Therefore, when an image on the display unit of the operation console is displayed on the display unit of the operation command console, the display lamp of the display unit on which the image is displayed lights up, and thus visibility of the operation monitoring apparatus can be improved.

Advantageous Effects of Invention

According to the operation monitoring apparatus of a nuclear power plant of the present invention, an image displayed on a display unit of an operation console operated by an operator can be displayed on a display unit of an operation command console operated by a shift supervisor. Therefore, the supervisor can confirm operations performed by the operator by the display unit of the operation console as required, and thus it is possible to improve communications between the supervisor and the operator in operation of the nuclear power plant, thereby ensuring highly safe monitoring of operations.

DESCRIPTION OF EMBODIMENTS

Exemplary embodiments of an operation monitoring apparatus of a nuclear power plant according to the present invention will be explained below in detail with reference to the accompanying drawings. The present invention is not limited to the embodiments.

Embodiment

Figure 1:
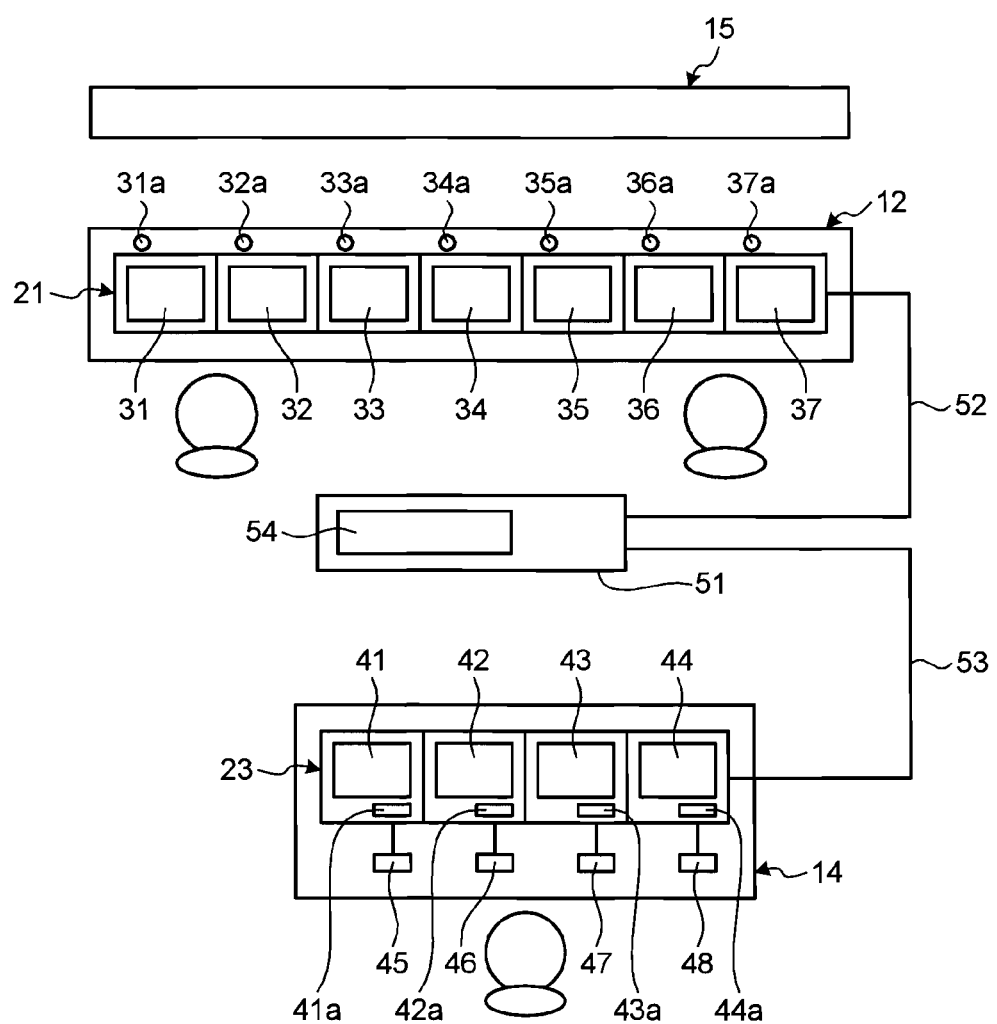
FIG. 1 is a schematic diagram of a control block in an operation monitoring apparatus of a nuclear power plant according to an embodiment of the present invention.
Figure 2:
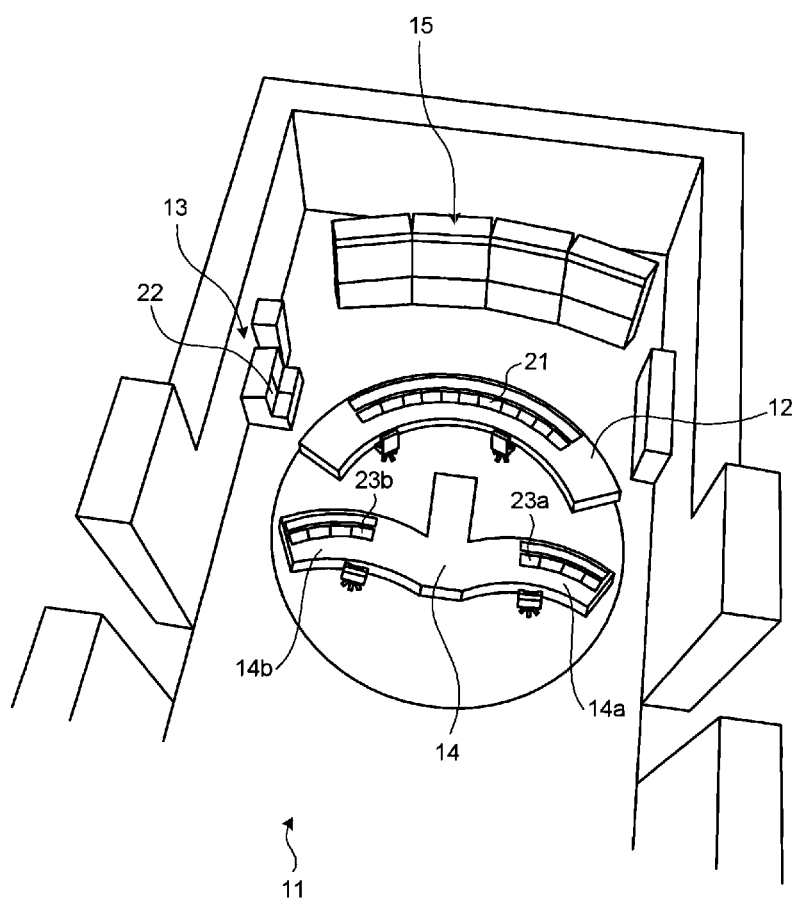
FIG. 2 is a schematic diagram of a central control room in the operation monitoring apparatus of a nuclear power plant according to the embodiment.
Figure 3:
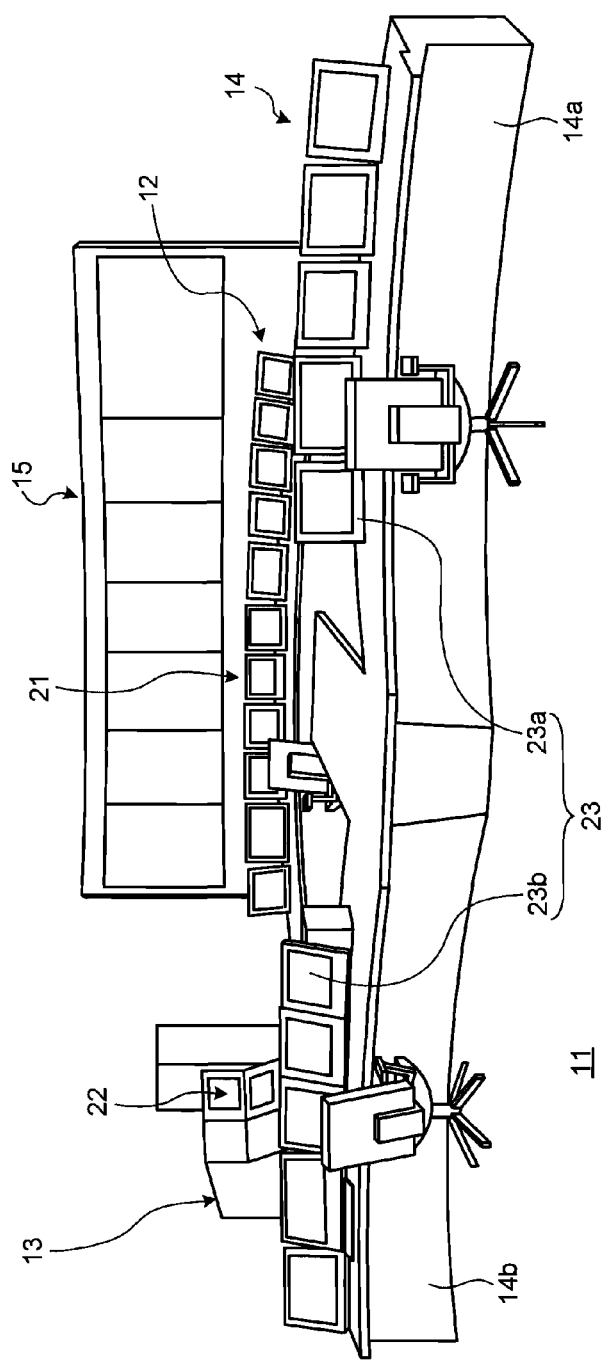
FIG. 3 is a schematic diagram of a function integrating VDU and a safety system VDU in the operation monitoring apparatus of a nuclear power plant according to the embodiment.

FIG. 1 is a schematic diagram of a control block in an operation monitoring apparatus of a nuclear power plant according to an embodiment of the present invention, FIG. 2 is a schematic diagram of a central control room in the operation monitoring apparatus of a nuclear power plant according to the embodiment, and FIG. 3 is a schematic diagram of a function integrating VDU and a safety system VDU in the operation monitoring apparatus of a nuclear power plant according to the embodiment.

In the operation monitoring apparatus of a nuclear power plant according to the present embodiment, as shown in FIGS. 2 and 3, a central control room 11 is a substantially hermetically-closed room, and a first operation console 12, a second operation console 13, an operation command console 14, and a large display panel 15 are arranged therein. In this case, the large display panel 15 is arranged at the front, and the first operation console 12 is arranged at the back of the large display panel 15 to face the front surface of the large display panel 15. The second operation console 13 is arranged adjacent to the first operation console 12 on the wall of the central control room 11. The operation command console 14 is arranged to face the front surface of the large display panel 15 at the back of the first operation console 12.

That is, in the central control room 11, the first operation console 12 and the operation command console 14 are arranged at the center of the central control room 11, and the second operation console 13 is arranged adjacent to the first operation console 12 near the wall surface of the central control room 11. Specifically, the operation command console 14 is arranged substantially at the center of a circle drawn at the center of the central control room 11, and the first operation console 12 is arranged to form a circular arc on a side of the large display panel 15 in the circle. The second operation console 13 is arranged outside of the circle, in close contact with the wall surface of the central control room 11.

A function integrating VDU (a function integrating operation device) 21 is mounted on the first operation console 12, and a safety system VDU 22 (a safety system operation device) is mounted on the second operation console 13. The function integrating VDU 21 has a custom-system-facility monitoring operation function and a safety-system-facility monitoring operation function. Meanwhile, the safety system VDU 22 is a backup VDU of the safety-system-facility monitoring operation function in the function integrating VDU 21, and has a safety-system-facility monitoring operation function to shut down a plant safely when this plant is in an abnormal state. The "VDU" stands for Visual Display Unit.

The first operation console 12 (the function integrating VDU 21) and the second operation console 13 (the safety system VDU 22) are operated by an operator. Meanwhile, the operation command console 14 is operated by a shift supervisor who issues commands to operators, and is mounted with an administrating VDU 23. In the present embodiment, the operation command console 14 is constituted by a supervising command console 14a (a supervisor's VDU 23a) and a technical command console 14b (an engineer's VDU 23b).

In the central control room 11 in the operation monitoring apparatus of a nuclear power plant according to the present embodiment constituted as described above, as shown in FIG. 1, the first operation console 12 is arranged to face the large display panel 15, and the operation command console 14 is arranged at the back of the first operation console 12. In this case, the first operation console 12 includes the function integrating VDU 21. The function integrating VDU 21 can perform monitoring and operations by a touch operation, and includes a display unit and an operating unit integrated therein. Furthermore, the operation command console 14 includes the administrating VDU 23, and the administrating VDU 23 can perform monitoring by a touch operation.

The function integrating VDU 21 includes a plurality (in the present embodiment, seven) of displays 31 to 37, and can perform monitoring and operations by a touch operation of an operator. The administrating VDU 23 includes a plurality (in the present embodiment, four) of displays 41 to 44, and can perform monitoring by a touch operation of a shift supervisor. The function integrating VDU 21 (the displays 31 to 37) and the administrating VDU 23 (the displays 41 to 44) are connected by a transfer device 51 and cables 52 and 53, and an image displayed on the displays 31 to 37 of the function integrating VDU 21 can be displayed on the displays 41 to 44 of the administrating VDU 23. Furthermore, the transfer device 51 includes a switching device 54, and an image on the displays 41 to 44 of the administrating VDU 23 can be switched to an image on the displays 31 to 37 of the function integrating VDU 21.

While corresponding to the displays 41 to 44 of the administrating VDU 23, operation switches 45 to 48 that operate the switching device 54 are provided. The operation switches 45 to 48 can switch a screen for operating the administrating VDU 23 and screens of the displays 31 to 37 of the function integrating VDU 21, and by inputting a number (a name) corresponding to each of the displays 31 to 37 of the function integrating VDU 21, the operation switches 45 to 48 can display the screen of the displays 31 to 37 corresponding to the input number on the displays 41 to 44.

While corresponding to the displays 41 to 44 of the administrating VDU 23, there are provided sub-displays (auxiliary display units) 41a to 44a that can display numbers (names) of the displays 31 to 37 in the function integrating VDU 21, which are displayed on the displays 41 to 44. Besides, while corresponding to the displays 31 to 37 of the function integrating VDU 21, there are provided display lamps 31a to 37a that light up when the screen of each of the displays 31 to 37 is displayed on the displays 41 to 44 of the administrating VDU 23.

In the operation monitoring apparatus of a nuclear power plant according to the present embodiment constituted as described above, each of operators performs reliable monitoring and operations under various supervisions and commands from a shift supervisor, thereby ensuring safe operations of the nuclear power plant. In this case, communications between the shift supervisor and each of the operators are made by verbal commands as well as pointing and calling performed by the operators.

In monitoring of operations of such a nuclear power plant, for example, when the shift supervisor wishes to confirm an operation status of the display 31 in the function integrating VDU 21 by using the display 41 in the administrating VDU 23, the shift supervisor switches a screen for operating the administrating VDU 23 to screens of the displays 31 to 37 of the function integrating VDU 21 by the operation switch 45 on the display 41. Thereafter, when a number corresponding to the display 31 is input, the screen of the display 31 is displayed on the display 41. That is, the switching device 54 receives a request signal from the operation switch 45 of the display 41 in the administrating VDU 23, and, by using the transfer device 51, transfers an image on the display 31 in the function integrating VDU 21 to the display 41 in the administrating VDU 23 to display the image on the display 41. Therefore, the shift supervisor can visually confirm monitoring of operations on the display 31 performed by operators.

At this time, the shift supervisor can recognize that the number of the display 31 in the function integrating VDU 21, which is displayed on the display 41 of the administrating VDU 23, is displayed on the sub-display 41a. Meanwhile, as the display lamp 31a lights up, operators can recognize that the shift supervisor is visually confirming the display 31 of the function integrating VDU 21.

As described above, in the operation monitoring apparatus of a nuclear power plant according to the present embodiment, there are provided the first operation console 12 that can be operated by operators and includes the displays 31 to 37, the operation command console 14 that can be operated by a shift supervisor and includes the displays 41 to 44, the transfer device 51 that can display an image displayed on the displays 31 to 37 of the first operation console 12 on the displays 41 to 44 of the operation command console 14, and the switching device 54 that switches an image on the displays 41 to 44 of the operation command console 14 to the image on the displays 31 to 37 of the first operation console 12 transferred by the transfer device 51.

Therefore, by displaying an image displayed on the displays 31 to 37 of the first operation console 12 on the displays 41 to 44 of the operation command console 14 as required, the shift supervisor can confirm operations performed by operators. Accordingly, it is possible to improve communications between the supervisor and the operators in operation of a nuclear power plant, thereby enabling to ensure high safety in monitoring of operations.

In the operation monitoring apparatus of a nuclear power plant according to the present embodiment, the operation switches 45 to 48 that operate the switching device 54 are provided on the operation command console 14. Therefore, by operating the switching device 54 by the operation switches 45 to 48, the shift supervisor can easily display an image on the displays 31 to 37 of the first operation console 12 on the displays 41 to 44 of the operation command console 14.

In the operation monitoring apparatus of a nuclear power plant according to the present embodiment, a plurality of displays 31 to 37 are provided on the first operation console 12, and an image selected from the respective displays 31 to 37 is displayed on the displays 41 to 44 of the operation command console 14 by the switching device 54. Therefore, by operating the switching device 54 by the operation switches 45 to 48, the shift supervisor can easily display a necessary image on the displays 31 to 37 in the first operation console 12 on the displays 41 to 44 of the operation command console 14.

In the operation monitoring apparatus of a nuclear power plant according to the present embodiment, the sub-displays 41a to 44a that can display numbers of the displays 31 to 37 of the first operation console 12 displayed on the displays 41 to 44 are provided on the operation command console 14. Therefore, by displaying currently displayed numbers of the displays 31 to 37 of the first operation console 12 on the sub-displays 41a to 44a of the operation command console 14, visibility of the operation monitoring apparatus can be improved.

In the operation monitoring apparatus of a nuclear power plant according to the present embodiment, the display lamps 31a to 37a that light up when an image is displayed on the displays 41 to 44 of the operation command console 14 are provided on the displays 31 to 37 of the first operation console 12. Therefore, when an image on the displays 31 to 37 of the first operation console 12 is displayed on the displays 41 to 44 of the operation command console 14, the display lamps 31a to 37a of the displays 31 to 37 on which the image is displayed light up, and thus visibility of the operation monitoring apparatus can be improved.

The operation monitoring apparatus of a nuclear power plant according to the present invention is not limited to the configuration in the embodiment described above, and the configuration, arrangement, and number of the first operation console 12, the operation command console 14, and the like can be changed as appropriate. Industrial Applicability As described above, in the operation monitoring apparatus of a nuclear power plant according to the present invention, by configuring such that an image on a display unit of an operation console operated by an operator can be displayed on a display unit of an operation command console operated by a shift supervisor, it is possible to improve communications between the supervisor and the operator in operation of a nuclear power plant, thereby enabling to ensure high safety in monitoring of operations, and the operation monitoring apparatus can be applied to any type of nuclear power plants.

REFERENCE SIGNS LIST 11 central control room
12 first operation console
13 second operation console
14 operation command console
15 large display panel
21 function integrating VDU (function integrating operation device)
22 safety system VDU (safety system operation device)
31 to 37 display
31a to 37a display lamp
41 to 44 display
41a to 44a sub-display (auxiliary display unit)
45 to 48 operation switch
51 transfer device
54 switching device

The invention claimed is:

1. An operation monitoring apparatus of a nuclear power plant, comprising:
   an operation console to be operated by an operator and includes an operation unit and a first display unit;
   an operation command console to be operated by a shift supervisor and includes an operation unit and a second display unit;
   a transfer device that is configured to operate to transfer an image displayed on the first display unit of the operation console to the second display unit of the operation command console; and
   a switching device that switches an image displayed on the second display unit of the operation command console to the image transferred by the transfer device,
   wherein the operation console includes a plurality of first display units, and the transfer device transfers an image selected from the first display units to the second display unit of the operation command console, and
   wherein each of the respective first display units of the operation console includes a respective display lamp that lights up automatically when the image is selected from the respective first display unit and transferred to the second display unit of the operation command console.

2. The operation monitoring apparatus of a nuclear power plant according to claim 1, wherein the operation command console includes an operation switch that operates the switching device.

3. The operation monitoring apparatus of a nuclear power plant according to claim 1, wherein the operation command console includes an auxiliary display unit that can display a name of each of the first display units on the second display unit.

* * * * *